April 2, 1935.   W. WILDERMUTH   1,996,448
SHEET GLASS APPARATUS
Filed Aug. 10, 1933
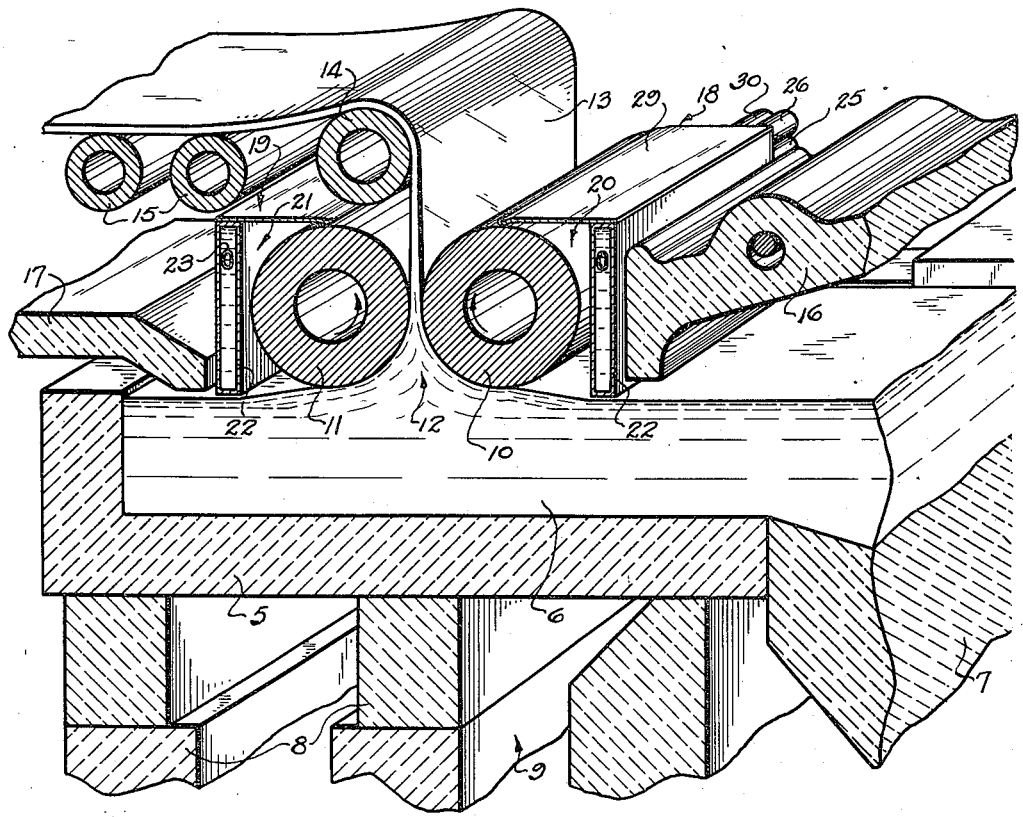
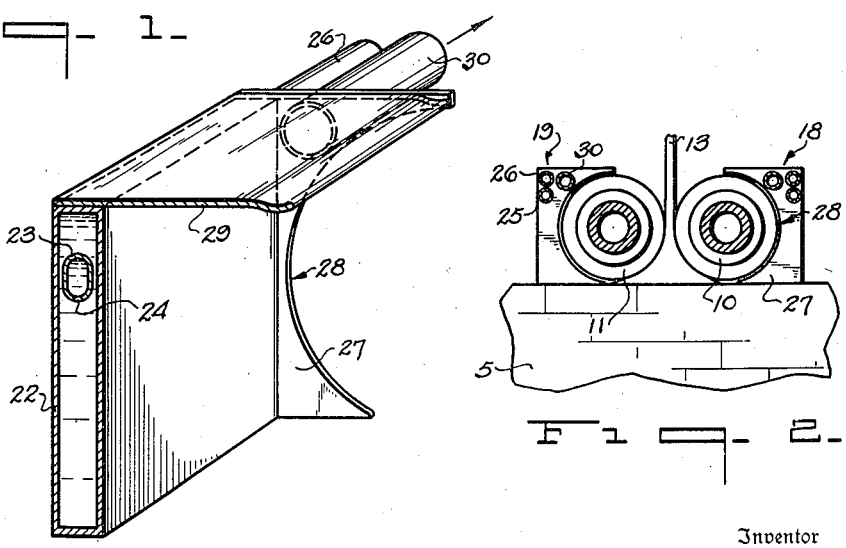
Inventor
WILLIAM WILDERMUTH.
Frank Fraser
Attorney Patented Apr. 2, 1935

1,996,448

UNITED STATES PATENT OFFICE 1,996,448

SHEET GLASS APPARATUS

William Wildermuth, Lancaster, Ohio, assignor to Libbey-Owens-Ford Glass Company, Toledo, Ohio, a corporation of Ohio Application August 10, 1933, Serial No. 684,470

10 Claims. (Cl. 49—33)

The present invention relates broadly to the manufacture of glass and more particularly to improvements in apparatus for producing sheet glass by a continuous rolling operation.

This invention has utility when incorporated in a rolling machine for producing continuous sheet glass wherein a pair of horizontally arranged forming rolls is positioned above the working receptacle containing a mass of molten glass, said rolls being spaced from one another to create a vertical sheet forming pass therebetween and being positively driven in a manner to draw a relatively heavy body of glass upwardly from the molten mass and reduce it to a sheet of substantially predetermined and uniform thickness. In order that proper formation of the sheet may take place, it is of course essential that sufficient glass be supplied to the forming rolls in order that an actual rolling of the glass may be achieved.

An important object of this invention, therefore, resides in the provision of novel means for facilitating and improving generally the advancing of the molten glass upwardly from the working receptacle to the sheet forming rolls, whereby the requisite amount of glass necessary at the sheet forming pass to permit an actual rolling thereof will be assured.

Another object of the invention is the provision of an apparatus embodying means positioned above the molten glass within the working receptacle alongside of the forming rolls outwardly thereof and cooperating therewith to form substantially closed chambers, together with means for creating a vacuum within said chambers in a manner to assist in lifting the molten glass upwardly to the forming rolls.

Other objects and advantages of the invention will become more apparent during the course of the following description when taken in connection with the accompanying drawing.

In the drawing wherein like numerals are employed to designate like parts throughout the same, Fig. 1 is a perspective sectional view through a sheet glass rolling apparatus embodying the present invention, Fig. 2 is a side elevation thereof, and Fig. 3 is a perspective sectional view of one of the hood-like members.

Referring now to the drawing, the rolling machine disclosed therein includes a relatively shallow working receptacle 5 adapted to contain a mass of molten glass 6 which is continuously supplied thereto from any suitable type of glass melting furnace 7. The working receptacle 5 may be supported upon stools 8 within a heating chamber 9 heated in any desired manner.

Positioned transversely above receptacle 5 is a pair of horizontally disposed sheet forming rolls 10 and 11 respectively, said rolls being positively driven and mounted with respect to one another to create a sheet forming pass therebetween. Upon rotation of the said rolls in the directions indicated by the arrows, they will function to draw a relatively heavy body of molten glass 12 upwardly from the molten mass 6 and reduce it to a sheet 13 of substantially predetermined and uniform thickness. This sheet is preferably continued upwardly for a relatively short distance and then deflected into the horizontal plane about a rotating bending roll 14, the said sheet being supported in its horizontal run upon a plurality of horizontally aligned conveyor rolls 15 and carried forwardly into and through an annealing lehr (not shown).

Also arranged above the molten mass of glass 6 within working receptacle 5 and in horizontally spaced relation to the forming rolls are lip-tiles 16 and 17 respectively, said lip-tiles acting to protect the sheet during its formative period from heated air and gases and to likewise direct heated currents issuing from the furnace 7 and chamber 9 downwardly upon the molten mass of glass.

As pointed out above, in order to produce a sheet of predetermined uniform thickness, it is essential that a sufficient quantity of molten glass be supplied to the forming rolls at all times to permit of an actual rolling operation. In accordance with the present invention, there are arranged above the working receptacle 5 alongside of the forming rolls 10 and 11 outwardly thereof the hood-like members 18 and 19 respectively, said members cooperating with the adjacent forming rolls to form substantially closed chambers 20 and 21 above the mass of molten glass 6. In other words, the hood-like members 18 and 19 are positioned within the spaces between the forming rolls 10 and 11 and the lip-tiles 16 and 17.

Each hood member 18 and 19 comprises a vertical cooler 22 positioned above the mass of molten glass 6 closely adjacent the surface thereof, said cooler constituting the outer side wall of the hood member and being in the form of a hollow metallic casing rectangular in cross section and of considerably greater height than width. A suitable temperature control medium, such as water or the like, is adapted to be continuously circulated through the cooler 22, and to this end there is arranged longitudinally within the said cooler a pipe 23 having a series of perforations 24 therein. The water or other cooling medium is adapted to be fed into one end of this pipe through the inlet pipe 25, the water flowing through the openings 24 into the casing and, after becoming heated, passing outwardly thereof through an outlet pipe 26. An outlet pipe may be provided at either one or both ends of the cooler.

Carried at each end of the cooler 22, and extending at right angles with respect thereto, is an end piece 27, said end pieces constituting the end walls of the chamber 20 or 21 and being cut away as at 28 to fit substantially around the adjacent forming roll 10 or 11. Secured to the top of the cooler 22 is a horizontal plate 29 constituting the top wall of the chamber, said plate being so arranged that the inner edge thereof rests upon the top of the adjacent forming roll. The plate 29 is preferably not connected with the end pieces 27. It will be readily apparent that when the hood members 18 and 19 are positioned in the manner illustrated in Fig. 1, with the bottoms of the coolers 22 closely adjacent the surface of the mass of molten glass 6 and the end pieces 27 fitting substantially around the forming rolls, they cooperate with the said rolls to provide the substantially closed chambers 20 and 21 above the mass of molten glass.

In carrying the invention into practice, the air is adapted to be exhausted from within the chambers 20 and 21 to produce a vacuum therein, said vacuum assisting in lifting the molten glass upwardly from the receptacle to the sheet forming rolls. To this end, there is associated with each end piece 27 of each hood member 18 and 19 a conduit 30 communicating with the respective chamber 20 or 21 and having connection with any suitable type of suction means for withdrawing the air from the said chamber. Upon the exhausting of the air from within the chambers, a vacuum will of course be created therein, and this vacuum acting upon the surface of the mass of molten glass will serve to lift the glass upwardly into contact with the forming rolls. The simultaneous rotation of the forming rolls will then serve to draw the molten glass upwardly into the sheet forming pass. As a result, the movement of the glass to the sheet forming pass will be greatly facilitated and the requisite amount of glass necessary for rolling assured. In other words, the suction created within the chambers 20 and 21 will act to hold the glass firmly against the bottoms of the forming rolls while the rotation of the said rolls will provide the necessary traction for moving the glass into the sheet forming pass. The bending roll 14 and conveyor rolls 15 will of course also assist in drawing the glass upwardly. Although an absolute vacuum may not be obtained within the chambers 20 and 21, yet the vacuum produced will be of sufficient degree to aid in lifting the molten glass upwardly. However, the vacuum created within the chambers will not be sufficient to overcome the traction of the forming rolls nor will it tend to draw the glass away from the sheet forming pass.

The coolers 22 forming the outer side walls of chambers 20 and 21 also function to cool the glass passing therebeneath to the forming rolls whereby to bring the said glass to a suitable temperature for rolling.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, means positioned above the molten glass within the receptacle alongside one of said rolls and cooperating therewith to form a substantially closed chamber, and means for creating a vacuum within said chamber to assist in lifting the molten glass upwardly to the forming rolls.

2. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, means positioned above the molten glass within the receptacle alongside of the forming rolls outwardly thereof and cooperating therewith to form substantially closed chambers, and means for creating a vacuum within each chamber to assist in lifting the molten glass upwardly to the forming rolls.

3. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, a hood-like member positioned above the molten glass within the receptacle alongside one of said rolls outwardly thereof and cooperating therewith to form a substantially closed chamber, and means for exhausting the air from within said chamber to create a vacuum which assists in lifting the molten glass upwardly to the forming rolls.

4. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, hood-like members positioned above the molten glass within the receptacle alongside of the forming rolls outwardly thereof and cooperating therewith to form substantially closed chambers, and means for exhausting the air from within each chamber to create a vacuum which assists in lifting the molten glass upwardly to the forming rolls.

5. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, a hood-like member positioned above the molten glass within the receptacle alongside one of said rolls outwardly thereof and cooperating therewith to form a substantially closed chamber, and means for creating a vacuum within said chamber to assist in lifting the molten glass upwardly to the forming rolls, said hood-like member comprising a hollow vertical outer side wall, end walls, and a horizontal top wall, and means for circulating a cooling medium through said side wall.

6. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, hood-like members positioned above the molten glass within the receptacle alongside of the forming rolls outwardly thereof and cooperating therewith to form substantially closed chambers, and means for creating a vacuum within each chamber to assist in lifting the molten glass upwardly to the forming rolls, each hood-like member comprising a hollow vertical outer side wall, end walls, and a horizontal top wall, and means for circulating a cooling medium through said side wall.

7. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, a hood-like member positioned above the molten glass within the receptacle alongside one of said rolls outwardly thereof and cooperating therewith to form a substantially closed chamber, means for exhausting the air from within said chamber to create a vacuum which assists in lifting the molten glass upwardly to the forming rolls, said hood-like member comprising a hollow vertical outer side wall, end walls, and a horizontal top wall, the inner edges of said end walls being cut away to fit substantially around the forming roll while the top wall is disposed above and engages the top of said roll, and means for circulating a cooling medium through said side wall.

8. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, hood-like members positioned above the molten glass within the receptacle alongside of the forming rolls outwardly thereof and cooperating therewith to form substantially closed chambers, means for exhausting the air from within each chamber to create a vacuum which assists in lifting the molten glass upwardly to the forming rolls, each hood-like member comprising a hollow vertical outer side wall, end walls, and a horizontal top wall, the inner edges of said end walls being cut away to fit substantially around the respective forming roll, while the top wall is disposed above and engages the top of said roll, and means for circulating a cooling medium through said side wall.

9. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, a hood-like member positioned above the molten glass within the receptacle alongside one of said rolls outwardly thereof and cooperating therewith to form a substantially closed chamber, and means for creating a vacuum within said chamber to assist in lifting the molten glass upwardly to the forming rolls, said hood-like member comprising a hollow vertical cooler positioned above the mass of molten glass closely adjacent the surface thereof and constituting the outer side wall of the hood-like member, means for circulating a cooling medium through said cooler, end walls carried at the opposite ends of said cooler and being cut away to fit substantially around the forming roll, and a horizontal top member also carried by the cooler and having its inner edge resting upon the top of said roll.

10. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, hood-like members positioned above the molten glass within the receptacle alongside of the forming rolls outwardly thereof and cooperating therewith to form substantially closed chambers, and means for creating a vacuum within each chamber to assist in lifting the molten glass upwardly to the forming rolls, each hood-like member comprising a hollow vertical cooler positioned above the mass of molten glass closely adjacent the surface thereof and constituting the outer side wall of the hood-like member, means for circulating a cooling medium through said cooler, end walls carried at the opposite ends of the cooler and being cut away to fit substantially around the respective forming roll, and a horizontal top wall also carried by said cooler and having its inner edge resting upon the top of said roll.

WILLIAM WILDERMUTH.